(12) United States Patent
Mentovich et al.

(10) Patent No.: US 11,847,533 B2
(45) Date of Patent: Dec. 19, 2023

(54) HYBRID QUANTUM COMPUTING NETWORK

(71) Applicant: Mellanox Technologies, Ltd., Yokneam (IL)

(72) Inventors: Elad Mentovich, Tel Aviv (IL); Kyle Scheps, Geneva (CH); Juan Jose Vegas Olmos, Solrød Strand (DK)

(73) Assignee: MELLANOX TECHNOLOGIES, LTD., Yokneam (IL)

( * ) Notice: Subject to any disclaimer, the term of this patent is extended or adjusted under 35 U.S.C. 154(b) by 568 days.

(21) Appl. No.: 17/110,382

(22) Filed: Dec. 3, 2020

(65) Prior Publication Data

US 2021/0174237 A1 Jun. 10, 2021

Related U.S. Application Data

(60) Provisional application No. 62/943,821, filed on Dec. 5, 2019.

(51) Int. Cl.
*G06F 9/46* (2006.01)
*G06N 10/00* (2022.01)
*G06F 13/40* (2006.01)
*G06F 9/48* (2006.01)

(52) U.S. Cl.
CPC ........... *G06N 10/00* (2019.01); *G06F 9/4881* (2013.01); *G06F 13/4022* (2013.01)

(58) Field of Classification Search
CPC .... G06N 10/00; G06F 9/4881; G06F 13/4022
See application file for complete search history.

(56) References Cited

U.S. PATENT DOCUMENTS

2009/0070402 A1 3/2009 Rose et al.
2017/0337155 A1* 11/2017 Novotny ............... G06F 30/394
2018/0365585 A1 12/2018 Smith et al.

OTHER PUBLICATIONS

Lambert et al., "Quantum-classical path integral. I. Classical memory and quantum nonlocality," The Journal of Chemical Physics, vol. 137, pp. 1-10, year 2012.

* cited by examiner

*Primary Examiner* — Gregory A Kessler
(74) *Attorney, Agent, or Firm* — KLIGLER & ASSOCIATES PATENT ATTORNEYS LTD

(57) ABSTRACT

A distributed computing network includes a quantum computation network and a processor. The quantum computation network includes one or more quantum processor units (QPUs) interconnected one with the other using quantum interconnects including each a quantum link and quantum network interface cards (QNICs), where each QPU is further connected to, using the QNIC, a quantum memory. The processor is configured to receive a quantum computation task, and, using a network interface card (NIC) (i) allocate the quantum computation task to the computation network, by activating any of the quantum interconnects between the QPUs according to the quantum computation task, and (ii) solve the quantum computation task using the quantum computation network.

20 Claims, 4 Drawing Sheets

HYBRID QUANTUM COMPUTING NETWORK

CROSS-REFERENCE TO RELATED APPLICATIONS

This application claims the benefit of U.S. Provisional Patent Application 62/943,821, filed Dec. 5, 2019, whose disclosure is incorporated herein by reference.

FIELD OF THE INVENTION

The present invention relates generally to distributed computing, and particularly to distributed computing comprising a network for quantum computing.

BACKGROUND OF THE INVENTION

Techniques for distributed quantum computing were previously proposed in the patent literature. For example, U.S. Patent Application Publication 2018/0365585 describes managing user-requests for access distributed quantum computing resources in a distributed quantum computing system. In a general aspect, a job request for accessing a quantum computing resource is received. The job request includes a user ID and a program. On authentication of a user associated with the job request, a job identifier is assigned to the job request, and a particular quantum computing resource is selected for the job request.

As another example, U.S. Patent Application Publication 2009/0070402 describes problem solving system that includes a number of special-purpose computers including at least one quantum computer. Problems are decomposed into sub-problems and routed to one of the special-purpose computers based on the problem class to which the problem belongs. Sub-solutions produced by the special-purpose computers are compiled to produce at least an approximate solution to the problem.

SUMMARY OF THE INVENTION

An embodiment of the present invention that is described hereinafter provides a distributed computing network including a quantum computation network and a processor. The quantum computation network includes one or more quantum processor units (QPUs) interconnected one with the other using quantum interconnects including each a quantum link and quantum network interface cards (QNICs), where each QPU is further connected to, using the QNIC, a quantum memory. The processor is configured to receive a quantum computation task, and, using a network interface card (NIC) (i) allocate the quantum computation task to the computation network, by activating any of the quantum interconnects between the QPUs according to the quantum computation task, and (ii) solve the quantum computation task using the quantum computation network.

In some embodiments, the computing network further includes, at least for a given pair of the QPUs, (i) a time counter associated with the quantum interconnect that connects the given pair of the QPUs, and (ii) a classical interconnect connected in parallel with the quantum interconnect, wherein the processor is configured to time-synchronize the given pair of the QPUs with one another using the time counter and the classical interconnect.

In some embodiments, the quantum computation network has a regular polygon graph topology in which vertices of the topology are the QPUs and edges of the topology are the quantum interconnects.

In an embodiment, the processor is configured to activate any of the quantum interconnects between the QPUs according to the quantum computation task using an algorithm that maps the quantum computation task to a regular polygon graph.

In another embodiment, the processor is further configured to receive the solved quantum computation task and, using the solved quantum computation task, solve a full computation task that includes the quantum computation task.

In some embodiments, the quantum interconnects are configured to support at least one of Remote Direct Memory Access (RDMA) and InfiniBand Trade Association (IBTA) standards.

In some embodiments, quantum interconnects are configured to communicate qubits.

In an embodiment, the processor includes one of a CPU and a GPU.

In some embodiments, wherein the quantum computation task is separable.

In other embodiments, wherein the quantum computation task is inseparable.

In yet other embodiments, the inseparable quantum computation task is formulated using a quantum-classical path integral (QCPI) model.

There is additionally provided, in accordance with another embodiment of the present invention, a distributed computing method including receiving a quantum computation task, and, using a network interface card (NIC), allocating the quantum computation task to the computation network, by activating any of the quantum interconnects between one or more quantum processor units (QPUs) according to the quantum computation task, wherein the one or more QPUs are interconnected one with the other using quantum interconnects including each a quantum link and quantum network interface cards (QNICs), and wherein each QPU is further connected to, using the QNIC, a quantum memory. The quantum computation task is solved using the quantum computation network.

The present invention will be more fully understood from the following detailed description of the embodiments thereof, taken together with the drawings in which:

DETAILED DESCRIPTION OF EMBODIMENTS

Overview

Figure 1:
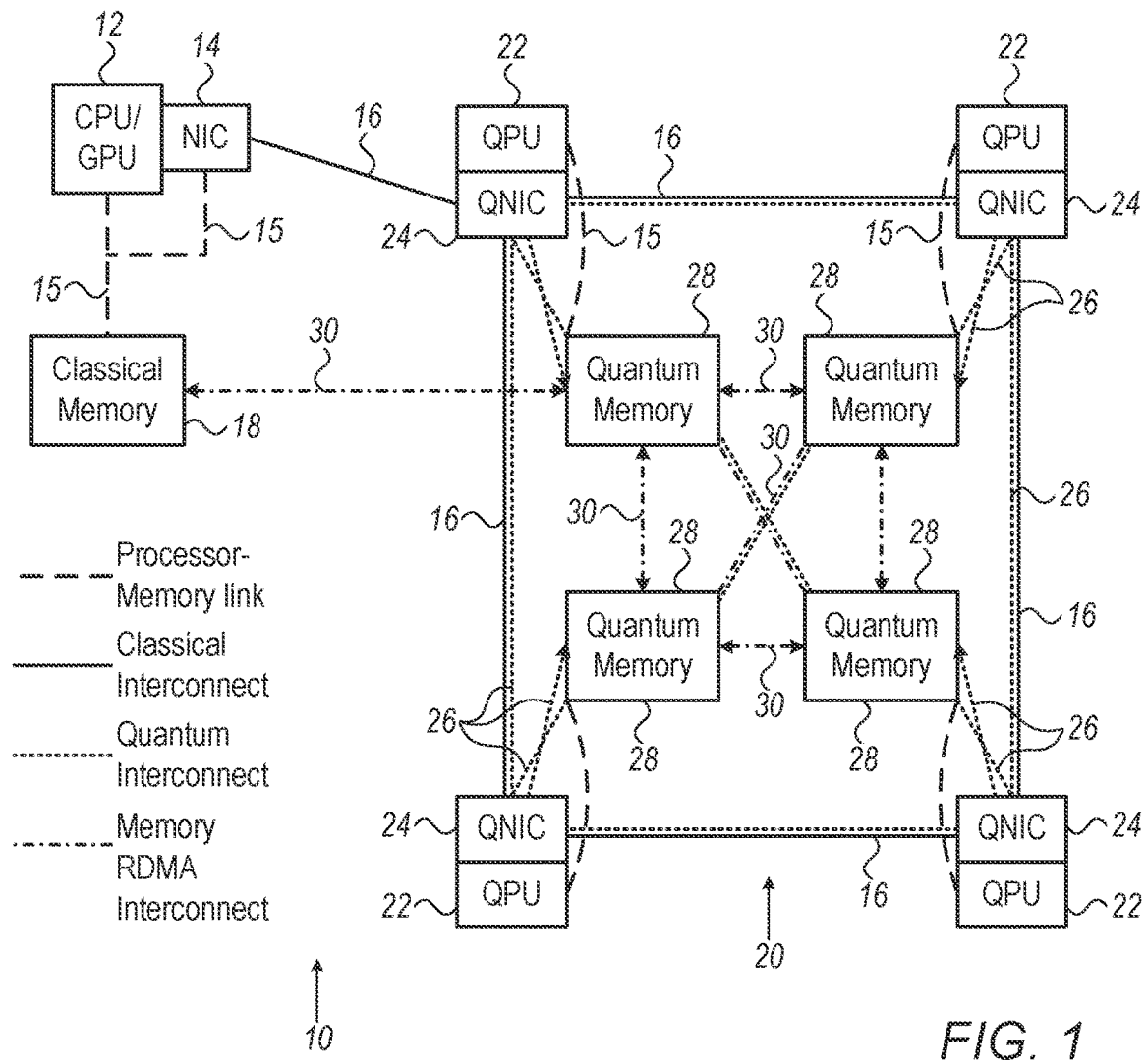
FIG. 1 is a schematic, pictorial illustration of a distributed computing network comprising a quantum computing network, in accordance with an embodiment of the present invention.

Quantum algorithms have been proven to perform specific computations exponentially faster than any existing classical algorithm. However, scaling of quantum computers is difficult. Therefore, it is more likely that near-term implementations will consist of small (below quantum supremacy) quantum processing units (QPU) interconnected with classical processing units (e.g., GPUs, FPGAs, CPUs, dedicated SoC cores), implemented as high performance computer (HPC) systems. To realize such an HPC, a new high-performance interconnect is required, capable of handling quantum data (e.g., qubits). New models (e.g., network architectures and efficient algorithms) of fast and efficient data transfer between node memories are also required. Considering the longer-term future, even when QPUs achieve quantum supremacy, HPC systems may still benefit from the disclosed distributed computing techniques.

Moreover, many quantum processing problems, such as in condensed-matter physics and in computational chemistry, are specifically suitable for solving using the aforementioned HPC systems. In these quantum problems, the full quantum treatment may be limited to a few degrees of freedom. Algorithms to solve the problem may involve partitioning an entire quantum system into a relatively small subsystem for which a quantum mechanical description is necessary, and an interacting environment which can be modeled by classical dynamics, using classical computing.

Path-integral formulation of such quantum problems is considered highly effective, with the formulation being trajectory based, and therefore offering a natural connection between quantum mechanics and classical mechanics. An example of using path integrals to study condensed phase dynamics is the quantum-classical path integral (QCPI) methodology described by Lambert and Makri in "Quantum-classical path integral. I. Classical memory and weak quantum nonlocality," Journal of Chemical Physics, 137, 22A552 (2012). This semi-classical approach reduces almost all possible quantum paths into several classical trajectories, therefore automatically truncating the calculations to become finite, in spite of the exponential growth of these paths with time evolution. The distinct forward and backward trajectories allow quantum interference. With an HPC system, such formalism can be implemented efficiently using (a) classical computing, such as running a Monte Carlo simulation for the environment, and (b) quantum computation, such as computing multi-level system dynamics, and then combining the results of steps (a) and (b) into a full solution.

Embodiments of the present invention that are described hereinafter provide HPC system architectures and algorithms for HPC systems comprising one or more QPUs. The disclosed system architectures and algorithms are generally divided into those configured to solve inseparable quantum problems and those configured to solve separable ones. However, in an embodiment, a hybrid HPC system architecture is provided, that is configured to solve a partially separable (in other words, partially inseparable) problem.

Embodiments of the present invention are not specific to solving quantum mechanical simulations, and may be used to perform computational tasks with similar dependencies that exist in other problem types such as quantum AI, Monte Carlo simulations, and optimization problems.

Separable quantum mechanics problems can be modeled by a Hamiltonian formulated as a sum of independent Hamiltonian terms. Such a quantum computing task can therefore be described by a set of independent Schrödinger equations, and henceforth divided into orthogonal calculations. The disclosed technique solves such a separable problem efficiently by parallelizing across multiple QPUs. For example, a disclosed HPC architecture using remote direct memory access (RDMA), has each equation sent from a single CPU to each respective QPU simultaneously.

Inseparable quantum computing problems cannot be decomposed in this way, and practically, they require an iterative quantum computation comprising intermediate quantum results that should be kept as qubits. An algorithm of this type would require frequent communication between the QPUs using quantum network interface cards (QNICs).

In particular, the Schrödinger equation may need to be solved for each nested layer in a Hamiltonian. This can be done efficiently by interconnecting a prespecified number of QPUs as vertices (i.e., nodes) in a prespecified graph topology (depending on the algorithm, connections between non-adjacent vertices could also be established).

A system based on RDMA and/or InfiniBand Trade Association (IBTA) standards, and using QNICs, would thus offer a significant increase in speed. For example, a Hamiltonian with N embedded layers, and a Quantum HPC system, can have N QPUs in an N vertex regular polygon topology interconnected using N QNICs.

As noted above, an optimized HPC architecture is typically algorithm dependent. In one embodiment, a dynamically configurable distributed computing network is provided, the network comprising (a) a quantum computation network comprising one or more quantum processor units (QPUs) interconnected using quantum interconnects each comprising a quantum link and quantum network interface cards (QNICs), where each QPU, using the QNIC, is further connected to a quantum memory, and (b) a processor which is configured to receive a full computation task comprising a quantum computation task, and, using a network interface card (NIC), to allocate the quantum computation task to the computation network by activating any of the quantum interconnects between the QPUs according to the quantum computation task.

In the context of this description, the term "QNIC" refers to a device capable of transmitting and receiving quantum information (e.g., qubits), to facilitate quantum communication between processors, in analogy to the functioning of a NIC with bits. The term "classical interconnect" refers to a link configured to transmit information in bits, e.g., between NICs. The term "quantum interconnect" refers to a link configured to transmit quantum information, e.g., qubits. The term "classical memory" refers to a memory that stores information in bits, whereas the term "quantum memory" refers to a memory that stores quantum information, e.g., qubits.

The processor of the dynamically configurable HPC system is configured to allocate an inseparable quantum computation task to the computation network using a network interface card (NIC) and one or more classical data links to communicate with auxiliary classical processors of the quantum computation network. A classical data link communicates bits whereas a quantum data link communicates qubits.

The dynamically configurable computing network has a regular polygon topology wherein the vertices of the topology are the QPUs and the edges of the topology are the quantum interconnects. The processor is configured to activate any of the quantum interconnects between the QPUs, according to the quantum computation task, using an algorithm that maps the quantum computation task to a regular polygon graph. The processor is configured to receive the solved quantum computation task and, using the solved quantum computation task, solve the full computation task.

System Description

FIG. 1 is a schematic, pictorial illustration of a distributed computing network 10 comprising a quantum computing network 20, in accordance with an embodiment of the present invention. Computing network 10 comprises a processor 12 that is connected to quantum computing network 20 using a NIC 14 and a classical data link 16. Processor 12 and NIC 14 are further connected (15) to a classical memory 18.

Quantum computing network 20 which, by way of example, is made of four QPUs 22, each QPU connected to the other QPUS using QNICs 24 and quantum links 26. Each QPU 24 is connected to a quantum memory 28 also using a quantum link 26.

Though mostly not shown, QPUs and quantum memories typically utilize classical processors and classical memories for accessory non-quantum computations, such as synchronizing timings, updating logs, and performing and storing results of other classical computation steps. To this end, quantum computing elements and quantum memories are also shown interconnected using classical links (i.e., those that communicate bits), such as links 15 and RDMA connections 30. In particular, network 20 comprises time counters to enable the introduction into quantum computations a measure of quantum dephasing with time, necessary for practical (e.g., finite) calculations, as described in FIG. 2. Time synchronization is performed using one of the links.

Figure 2:
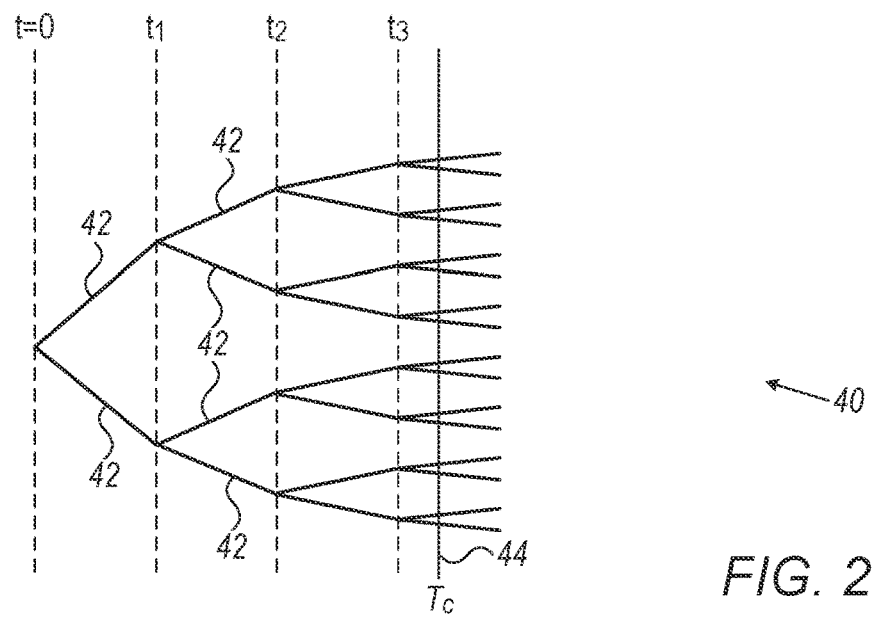
FIG. 2 is a graph representation of an inseparable quantum computing problem solvable by the quantum computing network of FIG. 1, in accordance with an embodiment of the present invention.

QPUs 22 are typically time-synchronized to perform quantum calculations, such path integral calculations described in FIG. 2. To this end, for any given pair of QPUs, the system may comprise (i) a time counter associated with the QPU-QPU connection and (ii) a classical interconnect 16 is connected in parallel with the QPU-QPU quantum interconnect. Processor 12 may synchronize a given pair of QPUs using the corresponding time counter over the classical interconnect.

Quantum computing network 20 is configured to solve inseparable quantum computing problems, such as described by a Hamiltonian with N embedded layers (i.e., for N=4, a Hamiltonian having three layers of nested operators $\hat{T}_j$, that can be described schematically herein as $\hat{H}=\hat{H}(\hat{T}_1(\hat{T}_2(\hat{T}_3))))$. Schrödinger's equation with that Hamiltonian must be solved iteratively, to take into account each nested operator layer $\hat{T}_j$ in the Hamiltonian.

The example illustration shown in FIG. 1 is chosen purely for the sake of simplicity of presentation. More generally, a Hamiltonian with N embedded layers can be solved using a quantum computing network having an N QPUs 22 arranged in a regular polygon graph topology interconnected using N QNICs 24.

In particular, processor 12 and quantum computing network 20 run dedicated algorithms as disclosed herein, including in FIGS. 3 and 4, that enable processor 12 and quantum computing network 20 to perform the disclosed steps, as further described below.

Solving an Inseparable Quantum Computing Problem

In some embodiments, network 10 of FIG. 1 represents a configuration suitable to solve a problem described by FIG. 2. The offload of the problem is determined by QNICs 24. To this end, each QNIC 24 has two different input/output ports, to, for example, interconnect classical links (not shown) and quantum links 26.

The interconnect ensures that when a connection between two QPUs is used, both processors are assigned to the same coherent time counter, i.e., they are time-synchronized. Since the QPUs are all time-synchronized, this distributed system is compatible with any time-constrained computation, i.e., we can pre-define a "Coherent Time Scale" $t_c$, for which any computation with processing length $t > t_c$ is ignored. Doing so thus frees up the Quantum RDMA system from having to transfer data from irrelevant computations.

An example computation that fits the diagram above is the following. Consider a system composed of a macroscopic environment interacting with a quantum subsystem. This can be modeled using Path Integrals. More specifically, using the aforementioned QCPI. As a high-level overview, this integral sums over the classical paths of the environment (i.e., a single path for each timestep since this is classical) and all the quantum paths of the quantum subsystem (grows exponentially with each timestep) using a complete master integral derived theoretically. To efficiently compute this problem, which is an example of a full computation task, according to that same paper, the full problem can be split into a classical part, i.e., to a calculation that does not require quantum information in qubits, to be solved within a classical HPC system, and a quantum path integral part to be solved using our network of QPUs, parallelizing the paths across QPUs. Furthermore, to tackle the exponential growth of quantum paths with number of timesteps, a cutoff time (e.g., $t_c$) is set over the number of timesteps considered at each point, turning the computation into an iterative process with jump one timestep after each cycle. This is because when summing over all paths (i.e. over all histories), to a good approximation, one can neglect the effect of histories far enough in the past. This is where the time counter and time synchronization described become relevant.

FIG. 2 is a graph 40 representation of an inseparable quantum computing problem solvable by the quantum computing network 20 of FIG. 1, in accordance with an embodiment of the present invention. Graph 40 represents dynamics of two interacting particles, which can be described by an ever-growing number of possible paths 42 of the many-body system. As seen, the complexity of such an inseparable problem grows exponentially with time, with two possible paths 42 between $t=0$ and $t=t_1$, four possible paths 42 between $t=t_1$ and $t=t_2$, eight possible paths between $t=t_2$ and $t=t_3$, and so on.

Hence, for each counter $T_n$, the system keeps track of whether a specific task should be processed in one of the QPUs, or rather sent via the classical interconnect to the mother CPU/GPU for classical processing.

In order to ensure that supportive memory is available throughout computation, memory banks are attached to each processor, containing either quantum or classical memory. This allows for distributed computing across the QPUs.

Importantly, a measure of quantum dephasing (e.g., loss of phase relationship of phases, $\Phi_k^{env}$, below), specified by coherent time $t_c$ 44, and necessary for practical calculations, limits the number of paths 42 that should be included in the quantum computation to a finite number. Namely, paths between times $t=t_{j-1}$ and $t=t_j$ of which $t_j$ is larger than $t_c$ 44 ($t_j > t_c$) are excluded.

A solution to such a problem, for example in the form of a density matrix, ρ(t), commonly used in condensed matter physics, is given by the aforementioned quantum-classical path integral (QCPI) model as:

$$\rho(t) = \int dq_0 \int dp_0 P(q_0, p_0) \sum_{\substack{\text{all system} \\ \text{paths } k}} e^{\frac{i}{\hbar}\Phi_k^{sys}} e^{\frac{i}{\hbar}\Phi_k^{env}(q(t'),p(t'))}$$

where the elements having phases Φ are best computed and summed as qubits, using quantum computing (usually a damping, such as coupling to an environment that causes dephasing, which is introduced to realistically truncate the infinite number of all paths k into a finite number of physically meaningful paths).

Specifically, to calculate and sum path elements $$e^{\frac{i}{\hbar}\Phi_k^{env}}(q(t'), p(t')),$$

QPUs 22 of network 20 need to communicate qubits among themselves, as well as store, in quantum memories 24, intermediate results of the many body calculations as qubits. Typically, the above elements diminish exponentially by having a negative real-valued decay factor, which makes the number of the elements finite.

A Method of Solving an Inseparable Quantum Computing Problem

Figure 3:
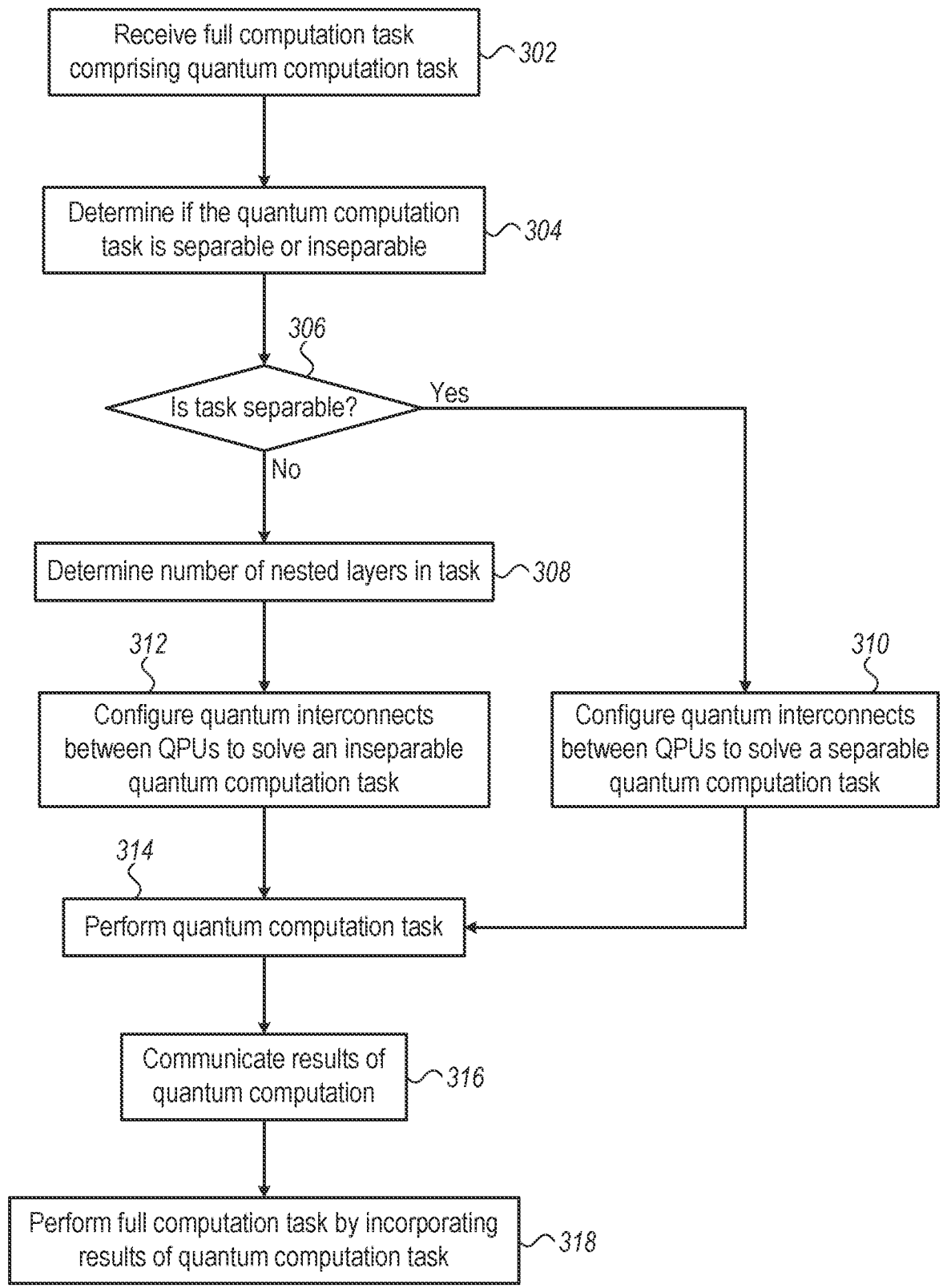
FIG. 3 is a flow chart that schematically illustrates a method of solving a full computation task comprising a quantum computing task by the distributed computing network of FIG. 1, in accordance with an embodiment of the present invention.

FIG. 3 is a flow chart that schematically illustrates a method of solving a full computation task comprising a quantum computing task by distributed computing network 10 of FIG. 1, in accordance with an embodiment of the present invention. The algorithm according to the presented embodiment carries out a process that begins with processor 12 receiving a full computing task comprising a quantum computing task to processor 12, at a computing problem uploading step 302.

Next, processor 12 determines, for example based on inputs received with the task, whether the quantum computing task is separable or inseparable, at a quantum computing task analysis step 304. Typically, the separability or inseparability is rooted in the form of the Hamiltonian to be solved.

If the processor determines that the quantum computing task is separable, at a checking step 306, then processor 12 configures quantum computing network 20 to perform the quantum computing task accordingly, at a quantum computing configuring step 310. Being a separable quantum computing task means that the configuration of network 20 is typically open ended, with each QPU performing an orthogonal calculation of the other QPUs, as shown in FIG. 5A.

If the processor determines that the quantum computing task is inseparable, at a checking step 306, then the processor determines a number of nested layers (e.g., nested Hamiltonians) involved, at a nesting number determination step 308. Then the processor configures quantum computing network 20 to perform the quantum computing task accordingly, at a quantum computing configuring step 310. Processor 12 then configures quantum computing network 20 to perform the quantum computing task accordingly, at a quantum computing configuring step 312. Being a inseparable quantum computing task means that the configuration of network 20 is typically closed ended which enables exchanging qubits during intermediate iterations of the quantum computation, with each QPU that is involved performing a portion of the calculation and communicating results to other QPUs via quantum links 26, as shown in FIG. 1.

Figure 5B:
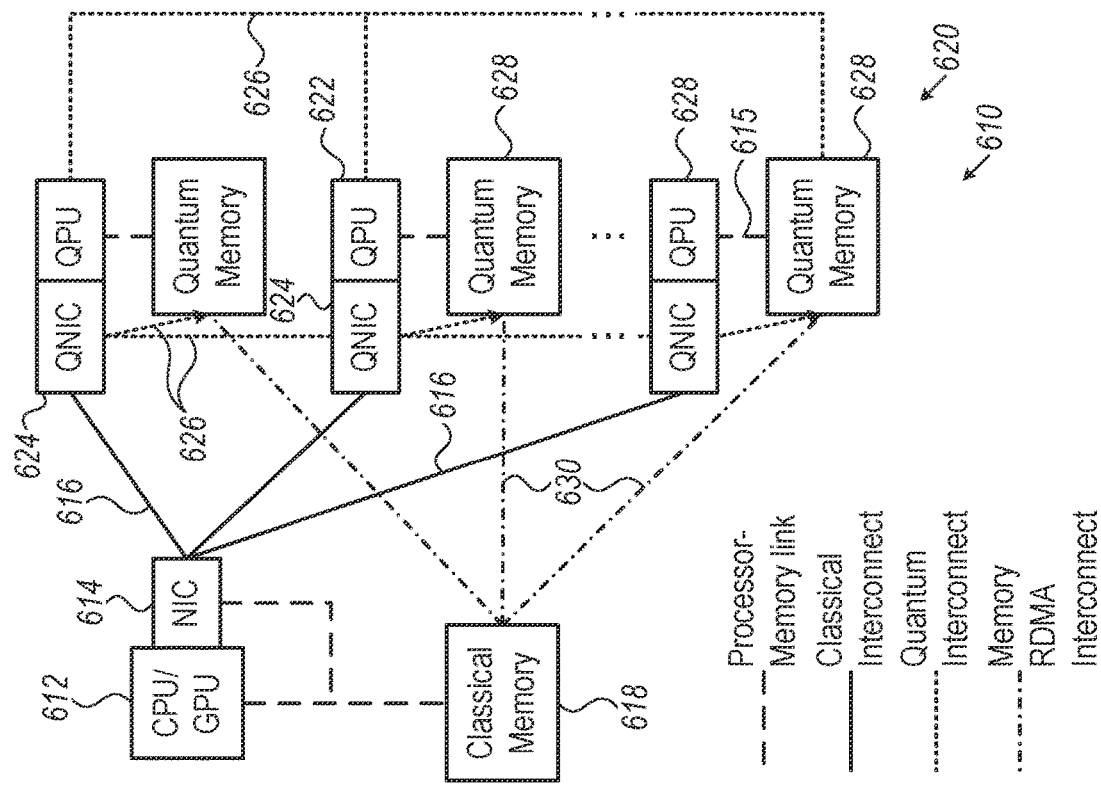
FIGS. 5A and 5B are schematic, pictorial illustrations of distributed computing networks comprising a quantum computing network configured to solve separable and partially separable quantum problems, respectively, in accordance with other embodiments of the present invention.
Figure 5A:
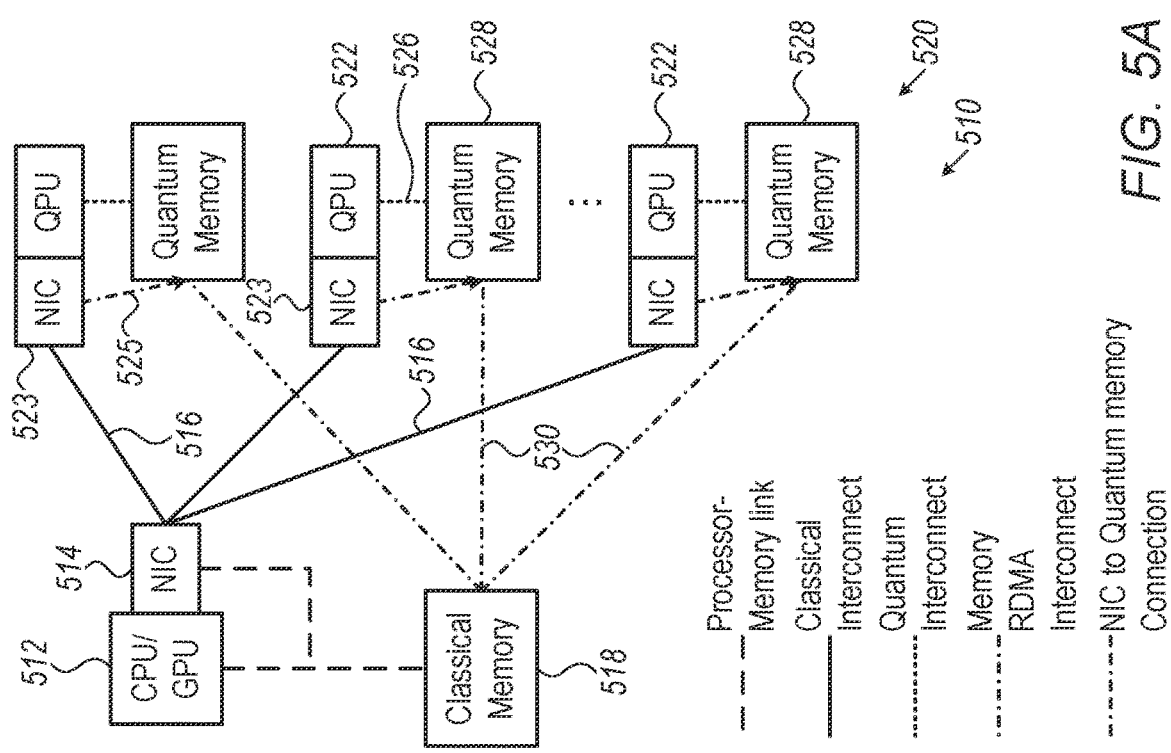

In case the problem is partially separable, or can be represented at least partially separable using Bayesian statistics, a hybrid configuration of network 20 may be used, as shown in FIG. 5B.

Using the proper configuration, network 20 then performs the quantum computing task, at a quantum computing step 314.

Network 20 communicates the results, which are quantum mechanical observables (e.g., energy spectrum of coupled electrons) and therefore can be represented using bits, back to processor 12, at a result communicating results step 316.

Finally, processor 12 combines results of classical computation steps (not shown) and quantum computation steps into a full computation, to solve the full computation task, at a full computing step 318.

Figure 4:
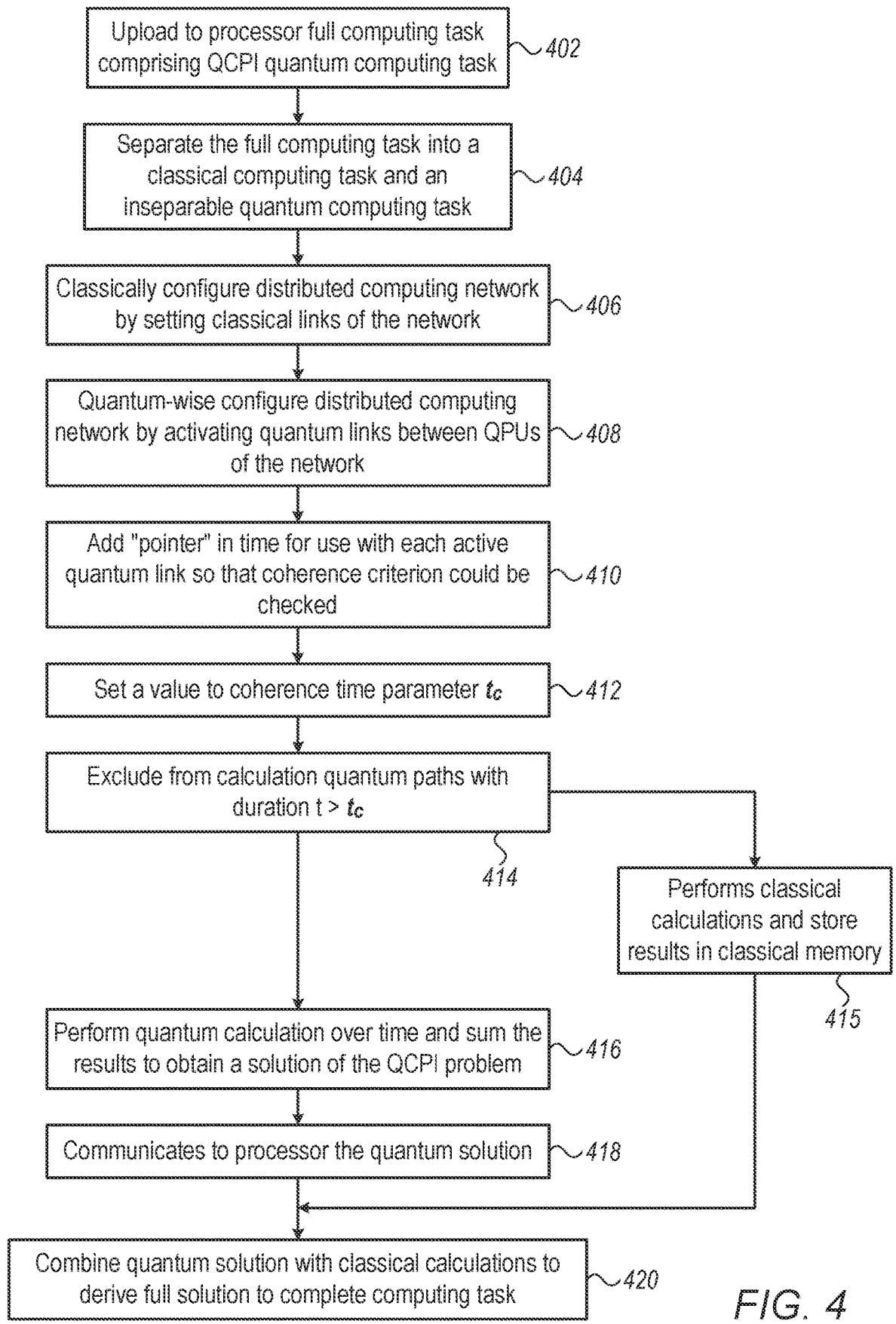
FIG. 4 is a flow chart that schematically illustrates a method of solving a full computation task comprising the quantum computing task of FIG. 2 by the distributed computing network of FIG. 1, in accordance with an embodiment of the present invention.

A Method of Solving an Inseparable Quantum Computing Problem Described by a QCPI Model FIG. 4 is a flow chart that schematically illustrates a method of solving a full computation task comprising the quantum computing task of FIG. 2 by distributed computing network 10 of FIG. 1, in accordance with an embodiment of the present invention.

The algorithm according to the presented embodiment carries out a process that begins with uploading a full computing task comprising a quantum computing task to processor 12, at a computing problem uploading step 402.

Next, processor 12 separates the full computing task into a classical computing task and a quantum computing task, at a task analysis step 404. The quantum computing problem considered herein is inseparable.

Next, processor 12 partially configures distributed computing network 10 by setting classical links of network 10 according to the computation task, at a classical configuration setting step 406.

Next, processor 12, using quantum computing methods, configures distributed computing network 10, by activating quantum links between QPUs 24 of network 20, according to the computation task, at a quantum configuration setting step 408.

At a time-counting preparation step 410, processor 12 adds a "pointer" in time for use with each active quantum link 42, in order for a coherence criterion to be checked.

At a coherence time criterion setting step 412, processor 12 sets a value to coherence time parameter $t_c$ 44.

At a quantum computation algorithm configuring step 414, processor 12 excludes quantum paths with duration $t > t_c$ from the calculation.

At a classical computation step 415, network 10 performs calculations that do not require use of QPUs, and stores results in a classical memory 18.

At a quantum computation step 416, network 20 performs calculations over time and sums the results to obtain a solution of the QCPI problem.

Network 20 communicates the solutions, which are quantum observables and can therefore be transmitted using bits, to process 12, at a quantum solution step 418.

Finally, at a full solution step 420, processor 12 combines the quantum solution with classical calculations that were performed on step 415 in order to derive a solution of the full computation problem (i.e., finalize the full computation task upload in step 402).

Solving Separable and Partially Separable Quantum Computing Problems

FIGS. 5A and 5B are schematic, pictorial illustrations of distributed computing networks comprising a quantum computing network configured to solve separable and partially separable quantum problems, respectively, in accordance with other embodiments of the present invention.

FIG. 5A shows a distributed computing network 510 comprising quantum computing network 520 that is configured to solve a separable quantum problem.

A separable quantum problem can be described by a Hamiltonian that can be decoupled into independent Hamiltonians, hence the quantum computing task can be divided into orthogonal calculations. These independent quantum problems are sent (by processor 512 having a memory 518) on classical links 516, each to be solved by QPUs 522 each having a quantum memory 528 connected with quantum link 526 to the QPU. The QPUs are connected using NICs 524, with NICs 524 also connected to quantum the memories for performing accessory operations using a classical link 525.

FIG. 5B shows a distributed computing network 610 comprising quantum computing network 620 that is configured to solve a partially separable quantum problem.

FIG. 5B assumes a Hamiltonian that is partially coupled, which hence can be divided into multiple orthogonal calculations, and then connected with an RDMA with a time axis (as explained in FIG. 1 above). Furthermore, this is sufficient in the case of a Bayesian matrix representative of an inseparable portion of a quantum problem.

A partially separable quantum problem (e.g., with some terms of the Hamiltonian that can be factored out, while others no, such as with deep and shallow semiconductor defects), can be described by a Hamiltonian that can be partially decoupled into independent Hamiltonians, hence the quantum computing task can be divided into solving a set of orthogonal calculations and solving an inseparable problem. These independent quantum problems are sent (by processor 612 having a memory 618) on classical links 616, each to be solved by a QPUs 522 each having a quantum memory 628. The QPUs are connected using QNICs 624 which have separate classical and quantum ports.

As seen, however, the QPUs are still connected using QNICs 624, as some of the intermediate results, related to the inseparable aspect of the problem, need to be communicated in the form of qubits via quantum links 626, between QPUs.

Though mostly not shown in FIGS. 5A and 5B, QPUs and quantum memories typically utilize classical processors and classical memories for accessory non-quantum computations, such as to synchronize timings, to update logs, and perform and store results of other classical computation steps. To this end, quantum computing elements and quantum memories are also shown interconnected using classical links (i.e., that communicate bits), such as links 615 and RDMA connections 530/630.

In various embodiments, the different classical computing elements of network 10 shown in FIGS. 1, 5A and 5B may be implemented using suitable hardware, such as using one or more discrete components, one or more Application-Specific Integrated Circuits (ASICs) and/or one or more Field-Programmable Gate Arrays (FPGAs), or in any other suitable way. Some of the functions of the system may be implemented in one or more general-purpose processors which are programmed in software to carry out the functions described herein. The software may be downloaded to the processors in electronic form, over a network or from a host for example, or it may, alternatively or additionally, be provided and/or stored on non-transitory tangible media, such as magnetic, optical, or electronic memory.

QPUs, QNICS and quantum links of network 20 shown in FIGS. 1, 5A and 5B may be implemented using suitable hardware, such as using superconducting devices, spintronics, coherent optical systems, and combinations thereof.

It will be appreciated that the embodiments described above are cited by way of example, and that the present invention is not limited to what has been particularly shown and described hereinabove. Rather, the scope of the present invention includes both combinations and sub-combinations of the various features described hereinabove, as well as variations and modifications thereof which would occur to persons skilled in the art upon reading the foregoing description and which are not disclosed in the prior art. Documents incorporated by reference in the present patent application are to be considered an integral part of the application except that to the extent any terms are defined in these incorporated documents in a manner that conflicts with the definitions made explicitly or implicitly in the present specification, only the definitions in the present specification should be considered.

The invention claimed is:

1. A distributed computing network, the network comprising:
    a quantum computation network comprising one or more quantum processor units (QPUs) interconnected one with the other using quantum interconnects comprising each a quantum link and quantum network interface cards (QNICs), where each QPU is further connected to, using the QNIC, a quantum memory; and
    a processor, which is configured to:
        receive a quantum computation task, wherein the quantum computation task is separable, and, using a network interface card (NIC), allocate the quantum computation task to the computation network, by activating any of the quantum interconnects between the QPUs according to the quantum computation task; and
        solve the quantum computation task using the quantum computation network.

2. The computing network according to claim 1, further comprising, at least for a given pair of the QPUs, (i) a time counter associated with the quantum interconnect that connects the given pair of the QPUs, and (ii) a classical interconnect connected in parallel with the quantum interconnect, wherein the processor is configured to time-synchronize the given pair of the QPUs with one another using the time counter and the classical interconnect.

3. The computing network according to claim 1, wherein the quantum computation network has a regular polygon graph topology in which vertices of the topology are the QPUs and edges of the topology are the quantum interconnects.

4. The computing network according to claim 1, wherein the processor is configured to activate any of the quantum interconnects between the QPUs according to the quantum computation task using an algorithm that maps the quantum computation task to a regular polygon graph.

5. The computing network according to claim 1, wherein the processor is further configured to receive the solved quantum computation task and, using the solved quantum computation task, solve a full computation task comprising the quantum computation task.

6. The computing network according to claim 1, wherein the quantum interconnects are configured to support at least one of Remote Direct Memory Access (RDMA) and Infini-Band Trade Association (IBTA) standards.

7. The computing network according to claim 1, wherein quantum interconnects are configured to communicate qubits.

8. The computing network according to claim 1, wherein the processor comprises one of a CPU and a GPU.

9. A distributed computing method, comprising:
receiving a quantum computation task, wherein the quantum computation task is separable, and, using a network interface card (NIC), allocating the quantum computation task to the computation network, by activating any of the quantum interconnects between one or more quantum processor units (QPUs) according to the quantum computation task, wherein the one or more QPUs are interconnected one with the other using quantum interconnects comprising each a quantum link and quantum network interface cards (QNICs), and wherein each QPU is further connected to, using the QNIC, a quantum memory; and
solving the quantum computation task using the quantum computation network.

10. The computing method according to claim 9, further comprising time-synchronizing at least a given pair of the QPUs with one another using a time counter and a classical interconnect, wherein (i) the time counter is associated with the quantum interconnect that connects the given pair of the QPUs, and (ii) the classical interconnect is connected in parallel with the quantum interconnect.

11. The computing method according to claim 9, wherein the quantum computation network has a regular polygon graph topology in which vertices of the topology are the QPUs and edges of the topology are the quantum interconnects.

12. The computing method according to claim 9, and comprising activating any of the quantum interconnects between the QPUs according to the quantum computation task using an algorithm that maps the quantum computation task to a regular polygon graph.

13. The computing method according to claim 9, and comprising receiving the solved quantum computation task, and using the solved quantum computation task solving a full computation task comprising the quantum computation task.

14. The computing method according to claim 9, wherein the quantum interconnects are configured to support at least one of Remote Direct Memory Access (RDMA) and Infini-Band Trade Association (IBTA) standards.

15. The computing method according to claim 9, wherein quantum interconnects are configured to communicate qubits.

16. The computing method according to claim 9, wherein the processor comprises one of a CPU and a GPU.

17. A distributed computing network, the network comprising:
a quantum computation network comprising one or more quantum processor units (QPUs) interconnected one with the other using quantum interconnects comprising each a quantum link and quantum network interface cards (QNICs), where each QPU is further connected to, using the QNIC, a quantum memory; and
a processor, which is configured to:
receive a quantum computation task, wherein the quantum computation task is inseparable, and, using a network interface card (NIC), allocate the quantum computation task to the computation network, by activating any of the quantum interconnects between the QPUs according to the quantum computation task; and
solve the quantum computation task using the quantum computation network.

18. The computing network according to claim 17, wherein the inseparable quantum computation task is formulated using a quantum-classical path integral (QCPI) model.

19. A distributed computing method, comprising:
receiving a quantum computation task, wherein the quantum computation task is inseparable, and, using a network interface card (NIC), allocating the quantum computation task to the computation network, by activating any of the quantum interconnects between one or more quantum processor units (QPUs) according to the quantum computation task, wherein the one or more QPUs are interconnected one with the other using quantum interconnects comprising each a quantum link and quantum network interface cards (QNICs), and wherein each QPU is further connected to, using the QNIC, a quantum memory; and
solving the quantum computation task using the quantum computation network.

20. The computing method according to claim 19, wherein the inseparable quantum computation task is formulated using a quantum-classical path integral (QCPI) model.

* * * * *